(12) United States Patent
Nomura et al.

(10) Patent No.: US 8,092,879 B2
(45) Date of Patent: Jan. 10, 2012

(54) FUEL SYSTEM HAVING EXCELLENT GASOLINE BARRIER PROPERTY

(75) Inventors: Takeshi Nomura, Kanagawa (JP); Takeshi Koyama, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 1148 days.

(21) Appl. No.: 10/684,511

(22) Filed: Oct. 15, 2003

(65) Prior Publication Data

US 2004/0081787 A1 Apr. 29, 2004

(30) Foreign Application Priority Data

Oct. 15, 2002 (JP) ................................. 2002-300821
Oct. 15, 2002 (JP) ................................. 2002-300822
Jan. 29, 2003 (JP) ................................. 2003-020170
Jan. 29, 2003 (JP) ................................. 2003-020171

(51) Int. Cl.
*B32B 1/08* (2006.01)
*B32B 23/00* (2006.01)
(52) U.S. Cl. ..................... 428/36.9; 428/34.1; 428/34.2; 428/35.7; 428/35.9
(58) Field of Classification Search ................. 428/34.1, 428/34.2, 35.7, 35.9, 36.9
See application file for complete search history.

(56) References Cited

U.S. PATENT DOCUMENTS

| | | | | |
|---|---|---|---|---|
| 3,475,266 A | * | 10/1969 | Strassel | 521/159 |
| 3,726,825 A | * | 4/1973 | Woodward et al. | 428/425.1 |
| 5,141,968 A | * | 8/1992 | Dietrich et al. | 521/167 |
| 5,370,910 A | * | 12/1994 | Hille et al. | 427/407.1 |
| 5,491,175 A | * | 2/1996 | Miyazaki et al. | 521/137 |
| 5,713,842 A | * | 2/1998 | Kay | 602/57 |
| 5,849,855 A | * | 12/1998 | Usui et al. | 528/45 |
| 6,033,749 A | * | 3/2000 | Hata et al. | 428/36.7 |
| 6,815,467 B2 | * | 11/2004 | Toyota et al. | 521/174 |
| 2003/0044553 A1 | * | 3/2003 | Ramanathan et al. | 428/35.8 |

FOREIGN PATENT DOCUMENTS

| | | |
|---|---|---|
| CH | 639 983 | 12/1983 |
| EP | 0 170 305 | 2/1986 |
| EP | 0 558 886 | 9/1993 |
| EP | 0 624 463 | 11/1994 |

OTHER PUBLICATIONS

European Search Report mailed Mar. 30, 2004, for EP No. 03 02 2352.

* cited by examiner

*Primary Examiner* — Marc Patterson
(74) *Attorney, Agent, or Firm* — Antonelli, Terry, Stout & Kraus, LLP.

(57) ABSTRACT

Provided is a fuel system comprising a fuel vessel, molded parts for a fuel and/or a tube for a fuel in which bodies are constituted from at least one of a thermoplastic resin and a synthetic rubber, wherein a coating layer is formed on the surfaces in at least one side of the insides and the outsides of the fuel vessel body, the molded part bodies for a fuel and/or the tube body for a fuel or at least one of connected parts in these bodies; the above coating layer is formed by curing a polyurethane resin composition comprising an active hydrogen-containing compound (A) and an organic polyisocyanate compound (B); and the above coating layer has a gasoline permeability coefficient of 2 g·mm/m²·day or less at 23° C. and a relative humidity of 60% RH. The above coating layer is excellent in a permeation-preventing performance against an automobile fuel (gasoline barrier property), an adhesion property between fuel vessel body and molding parts or tube, a heat resistance and an impact resistance, a flexibility, a bending resistance, etc., then a fuel vessel, molded parts for a fuel and a tube for a fuel which have excellent performances are obtained.

16 Claims, No Drawings

FUEL SYSTEM HAVING EXCELLENT GASOLINE BARRIER PROPERTY

BACKGROUND OF THE INVENTION

1. Field of the Invention

The present invention relates to a fuel system comprising a fuel vessel, molded parts for a fuel and a tube for a fuel which are excellent in a permeation-preventing performance against an automobile fuel (gasoline barrier property), a heat resistance and an impact resistance.

2. Description of the Related Art

In recent years, practical use turned from a metal-made fuel vessel to a thermoplastic resin-made fuel vessel has positively been promoted in a fuel vessel represented by a fuel vessel for automobiles from the viewpoints of a reduction in weight, a rust preventive property, easiness in mold processing and recycling property. When a fuel vessel is loaded in automobiles, various performances such as a heat resistance, a water resistance and an impact resistance are required to the vessel, and therefore a polyethylene-single layer type tank is spread as a thermoplastic resin-made fuel tank. However, there has been involved the problem that it has a relatively high gasoline permeability, so that a gasoline component is permeated and volatilized through a fuel vessel body. Accordingly, a multilayer tank comprising polyethylene and an ethylene-vinyl alcohol copolymer (EVOH) is proposed as a vessel having an excellent gasoline barrier property (Japanese Patent Application Laid-Open No. 29904/1997), and this has made it possible to obtain a fuel vessel having a better gasoline barrier property.

However, a gasoline barrier property of the fuel vessel is not necessary satisfactory to further strengthened environmental regulation, and therefore the performance is required to be raised further more.

In general, high density polyethylene is used for producing molded parts attached to a fuel vessel (for example, a fuel tube, a degassing line in an oil filler port, a valve for removing pressure and connectors thereof to a vessel body). This allows a fuel to be permeated and volatilized through these molded parts. Accordingly, even if a fuel vessel body is provided with an excellent gasoline barrier property, there has been brought about the problem that fuel is permeated and volatilized through molded parts connected thereto, and an amount thereof can not be neglected.

It is considered to use a barrier resin in place of high density polyethylene (for example, EVOH and the like) as means for solving the above problem. When using only a barrier resin for molded parts for a fuel vessel, the problem that gasoline is permeated and volatilized can be solved, but the heat fusing property thereof to a fuel vessel body, the mechanical strength and the impact resistance become unsatisfactory. Further, molded parts of a multilayer structure comprising high density polyethylene and a barrier resin are proposed (Japanese Patent Application Laid-Open No. 52658/2002). However, all connected parts produced by heat fusion and fitting are not of a structure in which they are substantially covered with a barrier resin, and the problem that gasoline is permeated and volatilized through the above parts has not yet been solved.

Further, in recent years, fuel tubes or hoses used mainly for vehicles have had to be elevated in a fuel permeation resistance as environmental regulation is strengthened. Tubes comprising conventional rubber materials as a principal component have come to be unable to meet these requirements, and therefore in order to meet them, tubes obtained by laminating a resin layer having a low permeability against a fuel such as gasoline in the inside of tubes comprising rubber materials have been put to actual use. Known are, for example, a tube in which a tube comprising polyamide base resin is inserted into the inside of a tube comprising a rubber material to form a double layer structure, a tube in which a tube-like rubber material is vulcanizably adhered with a fluorine rubber or a fluororesin layer to form a laminated structure (Japanese Patent Application Laid-Open No. 205745/2001), a tube in which a fluorine base resin powder or a resin powder obtained by blending it with a polyamide base resin is electrostatically coated on the inner face of a tube comprising a rubber material and heated to form a resin layer (Japanese Patent Application Laid-Open No. 25578/1996) and a tube in which a solution of a fluororesin or a polyamide resin is coated on the inner face of a tube comprising a rubber material to form a resin layer (Japanese Patent Application Laid-Open No. 165360/2001).

However, in the tube having a structure in which a tube of a different layer is inserted (Japanese Patent Application Laid-Open No. 205745/2001), it is difficult to make the wall thin, and the flexibility is reduced, so that application thereof to a tube having a complicated form is difficult. In the method in which a base resin powder is electrostatically coated (Japanese Patent Application Laid-Open No. 25578/1996), it is not easy to form a homogeneous resin layer having a prescribed thickness on the inner surface of a rubber hose, and there is the problem that pinholes are produced. Further, when using fluororesins in any tubes, it is difficult to obtain the good adhesiveness with base materials for a tube such as rubber materials, and it is required to carry out separately surface treatment or use an adhesive in combination. When using a polyamide resin (Japanese Patent Application Laid-Open No. 165360/2001), the good adhesiveness with base materials for a tube such as rubber materials is obtained, but the fuel permeation resistance thereof is not satisfactory, and the performance is required to be further elevated.

SUMMARY OF THE INVENTION

An object of the present invention is to solve the problems described above and provide a fuel system comprising a fuel vessel body which has a good gasoline barrier property and which is excellent in a heat resistance, an impact resistance and a profitability, molded parts for a fuel in which improved to a large extent is leakage of a fuel from the connected pats of the fuel vessel body with a tube for a fuel, a degassing line in an oil filler port and a valve for removing pressure and which are excellent in a gasoline barrier property, a heat fusing property and a mechanical strength and a tube for a fuel which is prepared by evenly forming a resin layer on the surface of a tube in tight contact therewith and which is excellent in a high barrier property against fuel permeation, a flexibility, a bending resistance and a heat resistance.

Intensive investigations repeated by the present inventors in order to solve the problems described above have resulted in finding that a fuel system which is excellent in a gasoline barrier property, an excellent adhesion property between the fuel vessel body and the molded parts or the tube, a flexibility, a bending resistance, a heat resistance, an impact resistance and a profitability is obtained by forming a high gasoline-barrier coating layer formed by curing a polyurethane resin composition comprising a specific active hydrogen-containing compound and a specific organic polyisocyanate compound as principal components on the surfaces of a fuel vessel, molded parts for a fuel and tubes for a fuel in which bodies are constituted from a thermoplastic resin or rubber and the connected parts thereof.

That is, the present invention provides a fuel system comprising at least one of a fuel vessel, molded parts for a fuel and a tube for a fuel in which bodies are constituted from at least one of a thermoplastic resin and a synthetic rubber, wherein a coating layer is formed on the surfaces in at least one side of the insides and the outsides of at least one of the fuel vessel body, the molded part bodies for a fuel and the tube body for a fuel or at least one of connected parts with these bodies; the above coating layer is formed by curing a urethane resin composition comprising an active hydrogen-containing compound (A) and an organic polyisocyanate compound (B); and the above coating layer has a gasoline permeability coefficient of 2 g·mm/m$^2$·day or less at 23° C. and a relative humidity of 60% RH.

DESCRIPTION OF THE PREFERRED EMBODIMENTS

In the present invention, the fuel system comprises the fuel vessel, the molded parts for a fuel, the tubes for a fuel or a combination thereof.

In this case, the fuel vessel means fuel vessels mounted on automobiles, auto-bikes, ships, aircrafts, generators and industrial and agricultural equipments or potable vessels for supplying these fuel vessels with fuels and vessels for storing fuels used for operating them. The molded parts for a fuel are molded parts which are mainly installed in the fuel vessel body, and to be specific, they include connectors for the fuel vessel, a cap for the fuel vessel and valves for the fuel vessel. Further, the tubes for a fuel are tubes used for the fuel vessel and the molded parts for the fuel vessel, and to be specific, they include tubes for transporting a fuel. The tubes for a fuel according to the present invention can be used as well for tubes other than those for transporting a fuel.

The fuel includes gasoline and gasoline obtained by blending methanol, ethanol or MTBE, that is, oxygen-containing gasoline as the representative examples thereof, and in addition thereto, heavy oil, gas oil and kerosene are given as the examples thereof.

Fuel Vessel Body:

First, the fuel vessel body shall be explained. The fuel vessel body constituting the fuel vessel in the present invention is usually made of a thermoplastic resin.

Any resins can be used for the thermoplastic resin constituting this fuel vessel body as long as the form can be maintained after molding, and they include, for example, polyolefin base resins such as polyethylene and polypropylene, polyester base resins such as polyethylene terephthalate, polyamide base resins such as nylon 6 and nylon 66, polyacryl base resins, polystyrene base resins, ethylene vinyl alcohol copolymer (EVOH base resins), polyvinyl alcohol base resins, polycarbonate base resins and polyvinyl chloride base resins. However, they shall not be restricted to these resins. Among them, the polyolefin base resins, ethylene vinyl alcohol copolymer and polyethylene terephthalate are preferred, and among the polyolefin base resins, more preferred are polyethylene resins such as low density polyethylene, high density polyethylene and linear low density polyethylene. Among the polyethylene resins, the high density polyethylene resins are particularly preferred. Further, in order to elevate various performances such as the heat resistance and the impact resistance, these resins may be blended, if necessary, and used or the vessel body may be provided with a multilayer structure.

Further, the thermoplastic resin having a gasoline barrier resin layer is preferable for the fuel vessel body. A vessel comprising a resin of a multilayer structure having a gasoline barrier resin layer for an intermediate layer or a vessel formed with a coating layer of a gasoline barrier resin can be used. In the case of a vessel comprising a resin of a multilayer structure having a gasoline barrier resin layer for an intermediate layer, polyolefin is used for most outside layer material from the view of mechanical strength etc. An ethylene-vinyl alcohol copolymer (EVOH based resin) is suitably used for the gasoline barrier resin layer, and EVOH having an ethylene content of 5 to 60 mole % and a saponification degree of 90% or more is preferred. High density polyethylene is preferably used for polyolefin of the most outside layer material.

Further, scrapped resins produced in molding may be reused as the thermoplastic resin constituting the fuel vessel body. To be specific, they include loss parts produced in molding and crushed matters of products recovered after used by ordinary consumers. The waste amount of resins is controlled by using such scrapped resins, and therefore it is preferred from the viewpoint of environmental protection and provides an effect of a reduction in the cost.

The thermoplastic resin forming this vessel body can be blended, if necessary, with various additives. Examples of being used as such additives are antioxidants such as 2,5-di-tert-butyl-hydroquinone and 2,6-di-tert-butyl-p-cresol, plasticizers such as phthalic acid esters, waxes, liquid paraffins and phosphoric acid esters, UV absorbers such as ethylene-2-cyano-3,3'-diphenyl acrylate and 2-(2'-hydroxy-5'-methylphenyl)benzo-triazole, antistatic agents such as pentaerythrite monostearate, sorbitan monopalmitate, sulfated polyolefins, polyethylene oxide and carbon wax, lubricants such as ethylenebisstearoamide and butyl stearate, colorants such as carbon black, phthalocyanine, quinacridone, indoline and azo base pigments and in addition thereto, fillers and heat stabilizers.

A method for obtaining the vessel body formed from the thermoplastic resin shall not specifically be restricted and includes molding methods carried out in the general fields of polyolefins, for example, extrusion molding, blow molding and injection molding, and extrusion molding and injection molding are particularly suited. Further, in order to elevate an adhesive property of the vessel body with the coating layer after molding, the internal and external surfaces of the vessel body may be subjected, if necessary, to various surface treatments such as corona discharge treatment and ozone treatment or a layer comprising an adhesive resin may be laminated on the face of the vessel body on which the coating layer is formed. An adhesive polyolefin resin can preferably be used as the adhesive resin, and to be specific, capable of being used are resins prepared by modifying polyolefin resins such as low density polyethylene, intermediate density polyethylene, high density polyethylene, linear low density polyethylene and polypropylene with unsaturated carboxylic acids such as maleic acid, acrylic acid and methacrylic acid or acid anhydrides thereof and resins obtained by diluting the modified matters thereof with polyolefin resins. The adhesive resin layer has a thickness of about 0.1 to 2.0 mm, particularly preferably about 0.5 to 1.0 mm.

The fuel vessel body has a whole thickness of preferably 300 to 10000 μm, more preferably 500 to 8500 μm and particularly preferably 1000 to 7000 μm. These thicknesses mean average thicknesses in the barrel part of the fuel vessel. The too large whole thickness makes the weight too large and exerts an adverse effect on the fuel consumption of automobiles, and the fuel vessel is increased in a cost. On the other hand, the too small whole thickness makes it impossible to maintain the rigidity and brings about the problem that the vessel is broken. Accordingly, it is important to set up the thickness corresponding to the capacity and the uses.

Molded Part Bodies for a Fuel:

The molded parts for a fuel include, to be specific, connectors for the fuel vessel, a cap for the fuel vessel and valves for the fuel vessel, which is mainly installed in the body of the fuel vessel, but they shall not be restricted thereto. Above gasoline barrier property, an excellent adhesion property between a fuel vessel body and the molded parts is required for the molded parts for a fuel which is mainly installed in the body of the fuel vessel.

The same thermoplastic resin as used for the fuel vessel body is used as well for the above molded part bodies, and it is possible to blend them with various additives, subject them to various treatments in order to elevate the adhesive property thereof with the coating layer and use an adhesive resin in combination.

In order to improve the properties of molded part bodies for a fuel, such as a heat resistance and a bending resistance, there is used a blended resign or a multi-layer of polyolefin resign and gasoline barrier resin such as EVOH etc., if required. As a fuel vessel body, scrapped resins produced in molding may be reused as the thermoplastic resin constituting the molded part bodies for fuel.

Tube Body for a Fuel:

Any resins can be used for the thermoplastic resin constituting the tube body according to the present invention as long as the form can be maintained after molding, and they include, for example, polyolefin resins such as polyethylene and polypropylene, polyester base resins such as polyethylene terephthalate; polyamide base resins such as nylon 6, nylon 66 and nylon 12, polyurethane base resins; polyacryl base resins, polystyrene base resins, polycarbonate base resins, ethylene-vinyl alcohol copolymer (EVOH) base resins, polyvinyl alcohol base resins, vinyl based resigns such as polyvinyl chloride base resins and polyvinyl acetate resins. In particular, preferred are vinyl based resins, polyolefin based resins having flexibility, polyamide based resins, polyurethane base resins, polyester base resins and polyacryl base resins.

The tube body for a fuel according to the present invention is constituted in a certain case from synthetic rubber having a flexibility such as polyisoprene rubber, polybutadiene rubber, epichlorohydrin rubber and copolymers thereof with acrylonitrile and styrene.

These materials may be blended, if necessary, and used for the tube body. The tube body may be constituted a single layer or a multilayer structure.

In respect to the thermoplastic resin and the rubber forming the tube body, several kinds of the thermoplastic resins and the rubbers may be blended, if necessary, and used in order to raise various performances such as the heat resistance and the flexibility. The same as the fuel vessel body, scrapped resins produced in molding may be reused for the thermoplastic resin constituting the tube body for a fuel.

Further, the thermoplastic resin and the rubber forming the tube body can be blended, if necessary, with the same various additives as used for the fuel vessel as long as the functions and the effects of the present invention are not damaged.

The tube body which formed from a thermoplastic resin and/or a synthetic rubber is produced by the same method as stated in the fuel vessel body. The thickness of the tube body is the same range as stated in the fuel vessel body.

Coating Layer:

Next, the coating layer formed on the surfaces in at least one sides of the bodies in the fuel system of the present invention shall be explained. The coating layer in the present invention is formed by curing a urethane resin composition comprising a component an active hydrogen-containing compound (A) and an organic polyisocyanate compound (B), and characterized by having a gasoline permeability coefficient of 2 g·mm/m²·day or less, preferably 0.2 g·mm/m²·day or less and particularly preferably 0.02 g·mm/m²·day or less at 23° C. and a relative humidity of 60% RH.

In this case, the gasoline permeability coefficient is a value showing an amount of gasoline permeating through a sample having a thickness of 1 mm per square meter in 24 hours. Pseudo gasoline prepared by blending octane, toluene and ethanol at a volume ratio of 45/45/10 is used for determining this gasoline permeability coefficient.

A skeletal structure represented by Formula (1) which is contained in the coating layer formed by curing the urethane resin composition described above accounts is preferable to contain for 20% by weight or more. The good gasoline barrier property is revealed by controlling the above skeletal structure to 20% by weight or more.

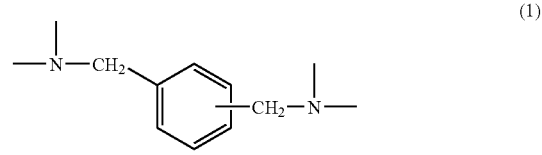

The active hydrogen-containing compound (A) and the organic polyisocyanate compound (B) in the urethane resin composition used for the coating layer shall be explained below in details.

Active Hydrogen-Containing Compound (A):

The active hydrogen-containing compound (A) is at least one compound selected from the group consisting of (1) alkyleneoxide adducts of polyamine, (2) amido-containing polyols, (3) polyol adducts of polyisocyanate compound, and (4) polyols. These compounds may be in the form of either an aliphatic compound, an alicyclic compound, an aroaliphatic compound or an aromatic compound, and may be appropriately selected therefrom according to applications and properties required in the applications. In order to attain a still higher gasoline barrier property, a still higher capability of preventing the leakage of gasoline from coating layer and a good adhesion property between fuel vessel body and molding parts or tube, among these compounds, preferred are such active hydrogen-containing compounds containing aromatic moieties or alicyclic moieties in a molecule thereof, and more preferred are such active hydrogen-containing compounds containing the backbone structure represented by the above formula (1). Also, the active hydrogen-containing compound contains amino and/or hydroxy end groups, and the total number of active hydrogen atoms contained therein is at least 2. In order to attain a high gas-barrier property and a good adhesion property, the total number of active hydrogen atoms contained in the active hydrogen-containing compound is preferably at least 3 and more preferably at least 4.

Examples of the polyamine of the alkyleneoxide adduct of polyamine (1) include aliphatic polyamines such as ethylenediamine, trimethylenediamine, tetra-methylenediamine, pentamethylenediamine, hexa-methylenediamine, ethanolamine and propanolamine; alicyclic polyamines such as 1,3- or 1,4-bis(aminomethyl)cyclohexane, 4,4'-, 2,4'- or 2,2'-dicyclohexylmethanediamine, isophoronediamine, norbornanediamine and bis(aminomethyl)tricyclodecane; aroaliphatic polyamines such as m- or p-xylylene-diamine, 1,3- or 1,4-tetramethylxylylene-diamine; and aromatic polyamines such as 2,4- or 2,6-tolylene-diamine and 4,4'-, 2,4'- or 2,2'-diamino-diphenylmethane. In order to attain a still higher gasoline barrier property, a still higher capability of preventing the leakage of gasoline from coating layer and a good adhesion property between fuel vessel body and molding parts or tube, among the polyamine (1), preferred are at least one compound among aroaliphatic polyamines, more preferred are m- or p-xylylene-diamine.

Examples of the amido-containing polyol (2) include hydroxyalkylamides or the like.

Examples of the polyisocyanate compound of the polyol adduct of polyisocyanate compound (3) include aromatic polyisocyanates such as m- or p-phenylene-diisocyanate, 2,4- or 2,6-tolylenediisocyanate, 4,4'-, 2,4'- or 2,2'-diphenylmethanediisocyanate, 4,4'-toluidinediisocyanate, 4,4'-diphenyletherdiisocyanate and 1,5- or 2,6-naphthalenediisocyanate; aroaliphatic polyisocyanates such as m- or p-xylylenediisocyanate and 1,3- or 1,4-tetramethylxylylenediisocyanate; alicyclic polyisocyanates such as 1,3- or 1,4-cyclohexanediisocyanate, isophoronediisocyanate, 1,3- or 1,4-bis(isocyanatomethyl)cyclohexane, 4,4'-, 2,4'- or 2,2'-dicyclohexylmethanediisocyanate and norbornanediisocyanate; aliphatic polyisocyanates such as hexamethylenediisocyanate; and buret compounds, allophanate compounds, urethodione compounds and isocyanurate compounds of the above-described aromatic polyisocyanates, aroaliphatic polyisocyanates, alicyclic polyisocyanates and aliphatic polyisocyanates. In order to attain a still higher gasoline barrier property, a still higher capability of preventing the leakage of gasoline from coating layer and a good adhesion property between fuel vessel body and molding parts or tube, among the polyisocyanate compound (3), preferred are at least one compound among aroaliphatic polyisocyanate, more preferred are m- or p-xylylene-polyisocyanate.

Examples of the polyol (4) include aliphatic polyols such as ethylene glycol, 1,2- or 1,3-propane diol, 1,3- or 1,4-butane diol, 1,5-pentane diol, 3-methyl-1,5-pentane diol, 1,6-hexane diol, 1,7-heptane diol, 1,8-octane diol, 1,9-nonane diol, 1,10-decane diol, diethylene glycol, triethylene glycol, tetraethylene glycol, dipropylene glycol, neopentyl glycol, glycerol, trimethylol propane and pentaerythritol; alicyclic polyols such as 1,3- or 1,4-cyclohexane dimethanol; and aroaliphatic polyols such as m- or p-xylylene glycol. In order to attain a still higher gasoline barrier property, a still higher capability of preventing the leakage of gasoline from coating layer and a good adhesion property between fuel vessel body and molding parts or tube, among the polyol (4), preferred are at least one compound among aroaliphatic polyol, more preferred are m- or p-xylylene glycol.

In the alkyleneoxide contained in the alkylene-oxide adduct of polyamine (1), any alkylene-oxide adduct may attain a high gasoline-barrier property and a good adhesion property between fuel vessel body and molding parts or tube. However, to attain a still higher gasoline-barrier property and a still higher capability of preventing the leakage of gasoline from coating layer and a good adhesion property, preferred are alkylene-oxide adduct of aroaliphatic polyamine. The number of carbon atoms of the alkyleneoxide is preferably 2 to 4. The molar ratio of the alkyleneoxide to the polyamine reacted may also be optional in order to attain the gasoline-barrier property. However, to attain a still higher gasoline-barrier property and adhesion property, the molar ratio ([alkylene-oxide]/[polyamine]) is preferably in the range of 2 to 16.

The alkyleneoxide adduct of polyamine (1) may be produced by conventionally known method of adding alkyleneoxide to polyamine. The temperature of the addition reaction is in the range of 20° C. to 150° C. according the kind of polyamine and alkyleneoxide. Various form of the product, from solid to liquid, may be produced according the kind of polyamine and alkyleneoxide.

In the polyol adduct of polyisocyanate compound (3), the polyol added to the polyisocyanate compound may be any compound belonging to the polyol (4). The equivalent ratio between the polyisocyanate compound and the polyol to be reacted may be optional to attain a high gasoline-barrier property and a good adhesion property between fuel vessel body and molding parts or tube. However, to attain a still higher gasoline-barrier property, a still higher capability of preventing the leakage of gasoline from coating layer and a good adhesion property, the equivalent ratio ([polyol]/[polyisocyanate compound] is preferably in the range of 2 to 20. In the reaction, the order of addition of these components is optional, and the respective components may be added by various conventionally known methods such as method of sequentially or simultaneously mixing whole amounts of the components, method of appropriately adding again the organic polyisocyanate compound, if required, during the reaction, or the like. The above reaction may be performed in the presence of an organic solvent, if required. Examples of the organic solvent include toluene, xylene, ethyl acetate, butyl acetate, cellosolve acetate, acetone, methyl ethyl ketone, methyl isobutyl ketone, tetrahydrofuran, dimethylformamide, dimethylacetamide, etc. These organic solvents may be used singly or in combination of any two or more thereof. Further, the reaction may also be performed in the presence of a reaction promoter such as known organometallic compounds (e.g., organolead or organotin compounds) and tertiary amines, if required. The reaction temperature is in the range of 20° C. to 160° C. according the kind of polyisocyanate compound and polyol. Various form of the product, from solid to liquid, is produced according the kind of polyisocyanate compound and polyol.

In addition, in order to improve various properties such as flexibility, impact resistance and moist heat resistance, the above active hydrogen-containing compounds (A) may be used singly or in the form of a mixture obtained by blending two or more compounds together at an appropriate mixing ratio.

Of these active hydrogen-containing compounds (A), in order to attain a still higher gasoline-barrier property, a still higher capability of preventing the leakage of gasoline from coating layer and a good adhesion property between fuel vessel body and molding parts or tube, preferred are alkyleneoxide adducts of aroaliphatic polyamine, polyol adducts of aroaliphatic polyisocyanate compound and aroaliphatic polyols, and more preferred are alkyleneoxide adducts of aroaliphatic polyamine.

Organic Polyisocyanate Compound (B)

The organic polyisocyanate compound (B) is a reaction product obtained by reacting (a) a polyfunctional isocyanate compound with (b) a polyfunctional alcohol, or a reaction product obtained by reacting (a) the polyfunctional isocyanate compound, (b) the polyfunctional alcohol and (c) a polyfunctional amine and/or a polyfunctional carboxylic acid with each other, and has two or more NCO end groups. The organic polyisocyanate compound (B) may be in the form of either an aliphatic compound, an alicyclic compound, an aroaliphatic compound or an aromatic compound, and may be appropriately selected therefrom according to application thereof and properties required for the applications. Of these organic polyisocyanate compounds, in order to attain a still higher gasoline-barrier property, a still higher capability of preventing the leakage of gasoline from coating layer and a good adhesion property between fuel vessel body and molding parts or tube, preferred are organic polyisocyanate compounds containing aromatic moieties or alicyclic moieties in a molecule thereof, and more preferred are organic polyisocyanate compounds containing the backbone structure represented by the above formula (1) in a molecule thereof. The equivalent ratio between the components (a) and (b) or between (a), (b) and (c) that are reacted with each other, may be optional to attain a high gasoline-barrier property and an adhesion property between fuel vessel body and molding parts or tub property. However, in order to attain a high gasoline-barrier property, a still higher capability of preventing the leakage of gasoline from coating layer and a good adhesion property between fuel vessel body and molding parts or tube, the equivalent ratio ([component (a)]/[component (b)] or [component (a)]/[component (b)+component (c)] is preferably in the range of 2 to 30.

The reaction method for producing the organic polyisocyanate compound (B) may be any of various methods conventionally used for this purpose. More specifically, the order of addition of the respective components is not particularly limited, for example, whole amounts of the respective components may be added and mixed together either sequentially or simultaneously, or the polyfunctional isocyanate compound may be appropriately added again, if required, during the reaction. The above reaction may be performed in the presence of an organic solvent, if required. Examples of the organic solvent include toluene, xylene, ethyl acetate, butyl acetate, cellosolve acetate, acetone, methyl ethyl ketone, methyl isobutyl ketone, tetrahydrofuran, dimethylformamide, dimethylacetamide, etc. These organic solvents may be used singly or in combination of any two or more thereof. Further, the reaction may also be performed in the presence of a reaction promoter such as known organometallic compounds (e.g., organolead or organotin compounds) and tertiary amines, if required. If the reaction product of the components (a) and (b) or the reaction product of the components (a), (b) and (c) contains an excessive amount of unreacted component (a), the reaction product may be subjected to known purification processes such as thin-film distillation and extraction to remove the unreacted component (a) therefrom.

Examples of the polyfunctional isocyanate compound (a) include aromatic polyfunctional isocyanate compounds such as m- or p-phenylenediisocyanate, 2,4- or 2,6-tolylenediisocyanate, 4,4'-, 2,4'- or 2,2'-diphenylmethane-diisocyanate, 4,4'-toluidine-diisocyanate, 4,4'-diphenyletherdiisocyanate and 1,5- or 2,6-naphthalenediisocyanate; aroaliphatic polyfunctional isocyanate compounds such as m- or p-xylylene-diisocyanate and 1,3- or 1,4-tetramethyl-xylylenediisocyanate; alicyclic polyfunctional isocyanate compounds such as 1,3- or 1,4-cyclohexane-diisocyanate, isophorone-diisocyanate, 1,3- or 1,4-bis(isocyanatomethyl)cyclohexane, 4,4'-, 2,4'- or 2,2'-dicyclohexylmethanediisocyanate and norbornane-diisocyanate; aliphatic polyfunctional isocyanates such as hexamethylenediisocyanate; and derivatives of these compounds, more specifically buret compounds, allophanate compounds, urethodione compounds and isocyanurate compounds of the above-described aromatic polyfunctional isocyanate compounds, aroaliphatic polyfunctional isocyanate compounds, alicyclic polyfunctional isocyanate compounds and aliphatic polyfunctional isocyanate compounds.

Of these polyfunctional isocyanate compound (a), in order to attain a still higher gasoline-barrier property, a still higher capability of preventing the leakage of gasoline from coating layer and a good adhesion property between fuel vessel body and molding parts or tube, preferred are at least one compound selected from xylylenediisocyanate and buret compounds, allophanate compounds, urethodione compounds and isocyanurate compounds of xylylene-diisocyanate, and more preferred is xylylene-diisocyanate.

In order to attain flexibility, an impact resistance, a resistance for humidity and heat etc., these polyfunctional isocyanate compounds may be used singly or in combination of any two or more thereof.

The component (b) is at least one poly-functional alcohol selected from the group consisting of $C_2$ to $C_{10}$ polyfunctional alcohols, and may be appropriately selected therefrom according to applications thereof and properties required in the applications. Examples of the polyfunctional alcohol (b) include aliphatic polyols such as ethylene glycol, 1,2- or 1,3-propane diol, 1,3- or 1,4-butane diol, 1,5-pentane diol, 3-methyl-1,5-pentane diol, 1,6-hexane diol, 1,7-heptane diol, 1,8-octane diol, 1,9-nonane diol, 1,10-decane diol, diethylene glycol, triethylene glycol, tetraethylene glycol, dipropylene glycol, neopentyl glycol, glycerol, trimethylol propane and pentaerythritol; alicyclic polyols such as 1,3- or 1,4-cyclohexane dimethanol; and aroaliphatic polyols such as m- or p-xylylene glycol.

The component (c) is at least one compound selected from the group consisting of aromatic polyfunctional amines, aroaliphatic polyfunctional amines, alicyclic polyfunctional amines, aliphatic polyfunctional amines, aliphatic alkanol amines, aromatic polyfunctional carboxylic acids, alicyclic polyfunctional carboxylic acids and aliphatic polyfunctional carboxylic acids, and may be appropriately selected therefrom according to applications thereof and properties required in the applications.

Examples of the aromatic polyfunctional amines include 2,4- or 2,6-tolylenediamine, 4,4'-, 2,4'- or 2,2'-diaminodiphenylmethane or the like. Examples of the aroaliphatic polyfunctional amines include m- or p-xylylenediamine, 1,3- or 1,4-tetramethylxylylene-diamine or the like. Examples of the alicyclic polyfunctional amines include 1,3- or 1,4-bis(aminomethyl)cyclohexane, 4,4'-, 2,4'- or 2,2'-dicyclohexylmethane diamine, isophoronediamine, norbornanediamine bis(aminomethyl)tricyclodecane or the like. Examples of the aliphatic polyfunctional amines include ethylenediamine, trimethylenediamine, tetramethylenediamine, pentamethylenediamine, hexamethylenediamine or the like. Examples of the aliphatic alkanol amines include ethanolamine, propanolamine, or the like. Examples of the aromatic polyfunctional carboxylic acids include isophthalic acid, terephthalic acid, 2,6-naphthalenedicarboxylic acid, p-phenylenedicarboxylic acid, trimellitic acid, pyromellitic acid or the like. Examples of the alicyclic polyfunctional carboxylic acids include 1,3-cyclohexanedicarboxylic acid, 1,4-cyclohexane-dicarboxylic acid or the like. Examples of the aliphatic polyfunctional carboxylic acids include malonic acid, succinic acid, adipic acid, suberic acid, azelaic acid, sebacic acid, dodecanedioic acid or the like.

Urethane Resin Composition

In the urethane resin composition of the present invention, the cured resin obtained by reacting the active hydrogen-containing compound (A) with the organic polyisocyanate compound (B) contains the backbone structure represented by the predescibed formula (1) in an amount of 20% by weight or higher, preferably 25% by weight or higher, more preferably 35% by weight or higher. When the cured resin contains the backbone structure represented by the above formula (1) in an amount of 20% by weight or higher, it can exhibit a high gasoline-barrier property, a still higher capability of preventing the leakage of gasoline from coating layer and a good adhesion property between fuel vessel body and molding parts or tube.

A blending proportion of the active hydrogen-containing compound (A) with the organic polyisocyanate compound (B) which is a principal component for the urethane resin composition may fall in a standard blending range used when an urethane resin composition is usually prepared by reacting an active hydrogen-containing compound and an organic polyisocyanate compound. To be specific, a ratio of the isocyanate group contained in the organic polyisocyanate compound (B) to the total number of OH groups and amino groups contained in the active hydrogen-containing compound (A) falls in a range of 0.8 to 2.0, preferably 0.9 to 1.7.

Further, an epoxy resin composition, a polyacryl base resin composition and a polyurea base resin composition may be mixed, if necessary, with the urethane resin composition in the present invention as long as the effects of the present invention are not damaged.

When the coating layer is formed on the surface of the fuel system, a wetting agent such as silicon or acryl compounds may be added to the urethane resin composition described above in order to aid wetting on the surface. The suitable wetting agent includes BYK331, BYK333, BYK348 and BYK381 which are available from Bic Chemie Co., Ltd. When adding them, they account preferably for a range of 0.01 to 2.0% by weight based on the whole weight of the cured reaction product.

In order to raise various performances such as a gasoline barrier property, an impact resistance and a heat resistance of the coating layer formed in the present invention, an inorganic filler such as silica, alumina, mica, talc, aluminum flake and glass flake may be added to the urethane resin composition. Considering the high gasoline barrier property, such inorganic fillers are preferably tabular. When adding them, they account preferably for a range of 0.01 to 10.0% by weight based on the whole weight of the cured reaction product.

Further, a coupling agent such as a silane coupling agent and a titanium coupling agent may be added to the urethane resin composition in order to elevate an adhesive property between fuel vessel body and molding parts or tube of the coating layer formed in the present invention. When adding them, they account preferably for a range of 0.01 to 5.0% by weight based on the whole weight of the cured reaction product.

These compositions of the coating layer should be kept separately to more than two liquid because the active hydrogen-containing compound (A) and the organic polyisocyanate compound (B) progress curing reaction in long time co-existence. Then these liquids should be mixed preferably at just before using to form the urethane resin composition.

The coating layer of the present invention is formed at the sufficient concentration of the resign compound and temperature to obtain a cured resin thereof. The concentration of the urethane resin composition varies depending upon selected kind of molded part, starting materials and coating method, etc. Namely, the concentration of the polyurethane resin composition is variously changed from the condition where no solvent is used, to the condition where the composition is diluted with a certain suitable organic solvent to a concentration of about 5% by weight. The organic solvent used for the preparation of the coating solution is not particularly restricted as long as they are inert to the reaction. Examples of the organic solvent include aromatic hydrocarbons such as toluene and xylene; ketones such as acetone, methyl ethyl ketone, methyl isobutyl ketone; ethers such as tetrahydrofuran and dioxane; esters such as ethyl acetate and butyl acetate; nitrites such as acetonitrile; and amides such as dimethylformamide and dimethylacetamide. These organic solvents may be used singly or in combination of any two or more thereof.

Also, the reaction for production of urethane and/or urea may be performed in the presence of urethanization catalysts such as amine-based catalysts, tin-based catalysts and lead-based catalysts, if required. These urethanization catalysts may be used singly or in combination of any two or more thereof.

Further, the urethane resin composition forming the coating layer formed in the present invention may be added, if necessary, required amounts of respective components including a rust preventive additive such as iron phosphate, calcium molybdate, vanadium oxide, water-dispersed silica and fumed silica, an organic pigment such as a phthalocyanine base organic pigment and a condensed polycyclic organic pigment and an inorganic pigment such as titanium oxide, zinc oxide, calcium carbonate, barium sulfate, alumina and carbon black.

Formation of Coating Layer:

In the present invention, the coating layer has practically a thickness of about 1 to 200 μm, preferably 5 to 100 μm. If it is less than 1 μm, the satisfactory gasoline barrier property is not revealed, and if it exceeds 200 μm, it is difficult to control the film thickness thereof.

When the coating layer is formed on the surface of the fuel vessel body, the coating layer can be formed on any surface of the inside and the outside of the fuel vessel body. Considering to reveal the substantial gasoline barrier property, the coating layer is formed at an area rate falling in a range of preferably 50 to 100%, more preferably 75 to 100% and particularly preferably 80 to 100% of a surface area of the vessel.

When the coating layer is formed on the surfaces of the molded part bodies for the fuel or tube, the coating layer is formed on the portions where a fuel is likely to be volatilized or scattered according to the form and the material of the parts or tube used, whereby gasoline is substantially inhibited from volatilizing or scattering. More preferably, the coating layer is formed on the surfaces of all the molded parts bodies for the fuel or tube.

The coating layer is formed by curing the urethane resin composition, and a method for coating the urethane resin composition on the surfaces of the fuel vessel body, the molded part bodies and/or tube, the connected parts of the molded part bodies with the fuel vessel body and the surface of the tube body can suitably be selected from optional methods such as roll coating, coating with ironing, brush coating, flow coating, dipping and spray coating according to the form of the bodies which are coated. Further, it is possible to control the coating amount, homogenize the appearance and uniformize the film thickness by an air knife method and a roll drawing method after these treatments. After coating the urethane resin composition, the curing reaction of the coating layer may be completed, if necessary, by means of a heating equipment. A method for heating the fuel vessel by means of a heating equipment can suitably be selected from conventionally known methods such as a dryer, high frequency induction heating, far infrared radiation heating and gas heating. The heating treatment is preferably carried out at a reached material temperature falling in a range of 50 to 300° C., preferably 70 to 200° C.

Connection of Vessel and Parts:

In the fuel system of the present invention, the coating layer is formed on surfaces in at least one side of the insides and the outsides of the fuel vessel body, the molded part bodies for a fuel and/or the tube body for a fuel and the connected parts of the bodies, and therefore the coating layer is advisably formed on at least a part of the surface of the fuel system body. The fuel system includes, for example, the fuel vessel having the above coating layer formed on the surface thereof which is installed (connected) with the molded part bodies having no above coating layer formed on the surface thereof and the fuel vessel having no above coating layer formed on the surface thereof which is installed (connected) with the molded part bodies having the above coating layer formed on the surface thereof.

A method for installing the fuel vessel body with the molded parts and the tube shall not specifically be restricted and includes installation by screwing and inserting and installation by heat fusion, and installation by heat fusing is preferred. Conventional methods are used for heat fusion and include a method in which the fusing faces of the fuel vessel body, the molded parts and the tube are heated by means of a heater and then they are fused, a method in which the fuel vessel body, the molded parts and the tube are subjected to high frequency fusion and a method in which the fuel vessel body, the molded parts and the tube are subjected to supersonic fusion. However, they shall not be restricted thereto.

The use embodiments of the molded parts as molded part connecters include an embodiment in which they are used as connectors for a fuel vessel installed to the fuel vessel body and an embodiment in which a flexible pipe, tube or hose for transporting a fuel is installed, but they shall not be restricted thereto. Connections by screwing, inserting and heat fusion are given as the examples of a method for installing the fuel vessel body with these connectors, and they are preferably installed by heat fusion. The connectors are suitably excellent in a stress crack resistance characteristic and an organic solvent resistance from the viewpoint of a long range continuous usability of the molded parts for the fuel vessel, that is, a product life thereof.

The cap for a fuel is used as a closing tool for an oil feeding port. A fitting method thereof shall not specifically be restricted and includes a screwing system and an inserting system. A large part of caps for a fuel is made of metal at present, but attentions are paid on a cap made of a thermoplastic resin from the viewpoint of a reduction in weight and recycling. A cap for a fuel which is made of a thermoplastic resin is preferably excellent in a gasoline barrier property, an organic solvent resistance and a stress crack resistance characteristic. It is repeatedly opened and closed, and therefore it is further preferably excellent as well in a mechanical strength such as an abrasion resistance.

When the coating layer is formed on the connected parts of the molded parts for a fuel with the fuel vessel body, the coating layer is formed on the portions where a fuel is likely to be volatilized or scattered according to the form and the material of the parts used and a method for connecting with the fuel vessel body, whereby gasoline is substantially inhibited from volatilizing or scattering. More preferably, the coating layer is formed on all the connected parts of the molded parts for a fuel with the fuel vessel body.

In the fuel vessel according to the present invention, the coating layer having an excellent gasoline barrier property is formed on the surface of the thermoplastic resin-made vessel by curing the epoxy resin composition. This makes it possible to provide the fuel vessel having, in addition to a gasoline barrier property, a heat resistance, a toughness and an impact resistance which are performances essentially endowed to an epoxy resin.

Further, in the fuel vessel installed molded parts for the fuel or tube according to the present invention, the coating layer having an excellent gasoline barrier property is formed on the surfaces of the above parts or the connected parts of the parts with the fuel vessel body or tube by curing the urethane resin composition. This inhibits volatilizing and scattering of gasoline from the molded parts for the fuel vessel and volatilizing and scattering of gasoline from the connected parts of the parts with the fuel vessel body which have been conventional problems, and the fuel vessel or the tube having an excellent gasoline barrier property, a flexibility, a bending resistance, a heat resistance, an impact resistance and a profitability is provided.

EXAMPLES

The examples of the present invention shall be introduced below, but the present invention shall by no means be restricted by these examples.

First, the methods for producing the active hydrogen-containing compound and the organic polyisocyanate compound used in the following Examples and Comparative Examples are explained below.
Active Hydrogen-Containing Compound A One mole of meta-xylylenediamine was charged into a reactor, heated to 50° C. under a nitrogen flow, and dropped with 4 mol of ethyleneoxide for 5 hours. After completion of the dropping, the reaction mixture was stirred at 100° C. for 5 hours to obtain an active hydrogen-containing compound A.
Organic Polyisocyanate Compound A Five moles of meta-xylylenediisocyanate were charged into a reactor, heated to 80° C. under a nitrogen flow, and then dropped with 1 mol of ethylene glycol for 1 hour. After completion of the dropping, the reaction mixture was stirred at 80° C. for 2 hours and then distilled at 180° C. under a vacuum degree of 0.133 kPa using a 0.03 m$^2$ thin-film distillation device while feeding the mixture at a velocity of 5 g/min to thereby obtain the organic polyisocyanate compound A.
Organic Polyisocyanate Compound B Seven and half (7.5) moles of meta-xylylene-diisocyanate were charged into a reactor, heated to 80° C. under a nitrogen flow, and then dropped with a mixture of 1 mol of glycerol and 270 g of dimethylformamide for 5 hour. After completion of the dropping, the reaction mixture was stirred at 80° C. for 2 hours and then distilled at 180° C. under a vacuum degree of 0.133 kPa using a 0.03 m$^2$ thin-film distillation device while feeding the mixture at a velocity of 3 g/min to thereby obtain the organic polyisocyanate compound B containing residual meta-xylylenediisocyanate in an amount of 1.0% by weight.
Organic Polyisocyanate Compound C Three moles of meta-xylylenediisocyanate were charged into a reactor, heated to 80° C. under a nitrogen flow, and then dropped with 1 mol of glycerol for 5 hours. After completion of the dropping, the reaction mixture was stirred at 80° C. for 2 hours and then distilled at 180° C. under a vacuum degree of 0.133 kPa using a 0.03 m$^2$ thin-film distillation device while feeding the mixture at a velocity of 3 g/min to thereby obtain the organic polyisocyanate compound C containing residual meta-xylylenediisocyanate in an amount of 1.0% by weight.

The gasoline barrier property was evaluated by the following method.

(1) Gasoline Permeability Coefficient of a Coating Layer in a Coat Film

Examples 1 to 3 and Comparative Example 1

An aluminum-made cap of 75 mm φ was charged with pseudo gasoline (isooctane/toluene/ethanol=45/45/10) and covered with a test film for evaluation, and a contact point of the cap and the film was coated with an adhesive and tightly sealed. Measurement was carried out by a gas phase method in which the film was not brought into direct contact with gasoline and by a liquid phase method in which the film was brought into direct contact with gasoline. The cap was left standing still for 500 hours under the environment of 60° C. to determine the gasoline permeability (g/m²·day) from a weight change. The gasoline permeability coefficient of the coating layer in the test film was calculated using the following equation:

$$1/R = 1/R_n(n=1,2,---) + DFT/P$$

wherein R is a gasoline permeability (g/m²·day) of the test film; $R_n$ (n=1,2,---) is a gasoline permeability (g/m²·day) of the respective base material films; DFT is a thickness (mm) of the coating layer; and P is a gasoline permeability coefficient (g·mm/m²·day) of the coating layer.

(2) Gasoline Permeability of the Tube and Gasoline Permeability Coefficient of the Coating Layer in the Tube Examples 4 to 6 and Comparative Examples 2 to 3

One end face of a test piece (length: 500 mm, inner diameter: 24 mm and thickness: 5 mm) obtained from the tube prepared was sealed with an aluminum-deposited film. The tube was charged with about 30 g of pseudo gasoline (isooctane/toluene/ethanol=45/45/10), and the other end face was similarly sealed with an aluminum-deposited film. It was left standing still for 500 hours under the environment of 60° C. and 60% RH to determine the gasoline permeability (g/m²·day) from a weight change.

The gasoline permeability coefficient of the coating layer was calculated using the following equation (The gasoline permeability coefficient of the tube without coating layer was calculated by the same method):

$$1R = 1/R' + DFT/P$$

wherein R is a gasoline permeability (g/m²·day) of the tube; R' is a gasoline permeability (g/m²·day) of the tube body; DFT is a thickness (mm) of the coating layer; and P is a gasoline permeability coefficient (g·mm/m²·day) of the coating layer.

(3) Gasoline Permeability of the Tube after Bending Treatment (10 Times)

Examples 4 to 6 and Comparative Examples 2 to 3

A test piece (length: 500 mm, inner diameter: 24 mm and thickness: 5 mm) obtained from the tube prepared was subjected 10 times to bending treatment. After the treatment, the gasoline permeability coefficient (g·mm/m²·day) was determined by the same method as the method for evaluating a gasoline permeability coefficient of the untreated product.

Example 1

Prepared was an acetone/ethyl acetate=1/0.3 solution (solid matter concentration: 35% by weight) by mixing 100 parts by weight of the Active Hydrogen-containing Compound A and 401 parts by weight of the Organic Polyisocyanate A, and 0.02 part by weight of an acryl base wetting agent (BYK381, manufactured by Bic Chemie Co., Ltd.) and stirred well to obtain a coating liquid. This coating liquid was coated on high density polyethylene (HDPE) having a thickness of 100 μm by means of a bar coater No. 24 and dried at 120° C. for 10 minutes, and then it was further cured at 80° C. for 12 hours, whereby a coated film was obtained. The coating layer had a thickness of 10 μm. A gasoline permeability coefficient of the coated film thus obtained was determined. The result thereof is shown in Table 1. The skeletal structure represented by Formula (1) contained in the above coating layer accounted for 48.0% by weight.

Example 2

A coated film was prepared and evaluated by the same methods as in Example 1, except that 387 parts by weight of the Organic Polyisocyanate B was substituted for the epoxy resin curing agent A. The result thereof is shown in Table 1. The skeletal structure represented by Formula (1) contained in the coating layer accounted for 50.7% by weight.

Example 3

A coated film was prepared and evaluated by the same methods as in Example 1, except that 395 parts by weight of the Organic Polyisocyanate C was substituted for the epoxy resin curing agent A. The result thereof is shown in Table 1. The skeletal structure represented by Formula (1) contained in the coating layer accounted for 49.6% by weight.

Comparative Example 1

A film of 100 μm comprising EVOH (ethylene content: 32 mole %, saponification: 99.6%) was evaluated for a gasoline permeability coefficient. The result thereof is shown in Table 1.

TABLE 1

| | Gasoline permeability coefficient (g · mm/m² · day) | |
| --- | --- | --- |
| | Gas phase Method | Liquid phase Method |
| Example 1 | 0.020 | 0.027 |
| Example 2 | 0.008 | 0.015 |
| Example 3 | 0.012 | 0.019 |
| Comparative Example 1 | 0.20 | 0.20 |

Example 4

An acrylonitrile-butadiene rubber was molded into a tube having an inner diameter of 24 mm and a thickness of 5 mm, and this was cut to a length of 500 mm to obtain a tube body. Prepared was a methanol/ethyl acetate=1/0.3 solution (solid matter concentration: 35% by weight) by mixing 100 parts by weight of Active Hydrogen-containing Compound A and 401 parts by weight of the Organic Polyisocyanate A, and 0.02 part by weight of the acryl base wetting agent (BYK381, manufactured by Bic Chemie Co., Ltd.) and stirred well to obtain a resin solution. One end face of the tube body described above was sealed with an aluminum matter (aluminum-deposited film), and this resin solution was filled into the tube body and immediately discharged, whereby the resin solution was coated onto the inner face of the tube body. After discharging the resin solution, the aluminum matter was detached from the end face of the tube body, and the resin solution was cured at 120° C. for 10 minutes and then at 80° C. for 12 hours to form a coating layer. The coating layer had a thickness of 10 μm. The tube in which the coating layer was formed was evaluated for a gasoline barrier property and a gasoline barrier property after bending (a gasoline permeability coefficient of the coating layer, a gasoline permeability of the tube and a gasoline permeability of the tube after the bending treatment (10 times)). The results thereof are shown in Table 2. The skeletal structure represented by Formula (1) contained in the above coating layer accounted for 48.0% by weight.

Example 5

A tube was prepared by the same method as in Example 4, except that 387 parts by weight of the Organic Polyisocyanate B was substituted for the Organic Polyisocyanate A, and the gasoline barrier property and the gasoline barrier property after bending were evaluated. The results thereof are shown in Table 2. The skeletal structure represented by Formula (1) contained in the above coating layer accounted for 50.7% by weight.

Example 6

A tube was prepared by the same method as in Example 4, except that 395 parts by weight of the Organic Polyisocyanate C was substituted for the Organic Polyisocyanate A, and the gasoline barrier property and the gasoline barrier property after bending were evaluated. The results thereof are shown in Table 2. The skeletal structure represented by Formula (1) contained in the above coating layer accounted for 49.6% by weight.

Comparative Example 2

A nylon-12 resin was used as a barrier resin layer, and an acrylonitrile-butadiene rubber was used as an external layer to mold them into a tube having an inner diameter of 24 mm, a thickness of 0.1 mm in the barrier resin layer and a thickness of 5 mm in the external layer by means of an injection molding machine. This tube was cut to a length of 500 mm, and the gasoline barrier property and the gasoline barrier property after bending were evaluated. The result thereof is shown in Table 2.

Comparative Example 3

A tube was prepared by the same method as in Comparative Example 2, except that a copolymer resin of vinylidene fluoride, propylene hexafluoride and ethylene tetrafluoride was used as the barrier resin layer, and the gasoline barrier property and the gasoline barrier property after bending were evaluated. The result thereof is shown in Table 2.

TABLE 2

|  | Gasoline permeability coefficient of coating layer ($g \cdot mm/m^2 \cdot day$) | Gasoline permeability of tube ($g/m^2 \cdot day$) | Gasoline permeability of tube after bending ($g/m^2 \cdot day$) |
| --- | --- | --- | --- |
| Example 4 | 0.015 | 1.5 | 1.5 |
| Example 5 | 0.010 | 1.0 | 1.0 |
| Example 6 | 0.007 | 0.7 | 0.7 |
| Comparative Example 2 | — | 150 | 150 |
| Comparative Example 3 | — | 14 | 100 |

What is claimed is:

1. A fuel system comprising at least one of a fuel vessel, molded parts for a fuel and a tube for a fuel in which bodies are constituted from at least one of a thermoplastic resin and a synthetic rubber, wherein a coating layer is formed on the surfaces of the insides of at least one of the fuel vessel body, the molded part bodies for a fuel and the tube body for a fuel or at least one of connected parts in these bodies; the above coating layer is formed by curing an urethane resin composition comprising an active hydrogen-containing compound (A) and an organic polyisocyanate compound (B); and the above coating layer has a gasoline permeability coefficient of 0.2 $g \cdot mm/m^2 \cdot day$ or less at 23° C. and a relative humidity of 60% RH;

wherein a skeletal structure represented by Formula (1), which is contained in the coating layer formed by curing said urethane resin composition, accounts for 20% by weight or more:

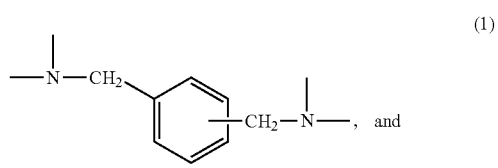

(1)

wherein the active hydrogen-containing compound (A) comprises alkyleneoxide adducts of xylylenediamine produced by reacting alkyleneoxide and xylylenediamine with a molar ratio [(alkyleneoxide)/(xylylenediamine)] in a range of 2 to 16, and wherein the organic polyisocyanate compound (B) described above comprises a reaction product of (a) and (b) or a reaction product of (a), (b) and (c) each described below and has two or more NCO end groups:

(a) xylylenediisocyanate, (b) at least one polyfunctional alcohol selected from the group consisting of $C_2$ to $C_{10}$ polyfunctional alcohols, (c) at least one compound selected from the group consisting of aromatic polyfunctional amines, aroaliphatic polyfunctional amines, alicyclic polyfunctional amines, aliphatic polyfunctional amines, aliphatic alkanol amines, aromatic polyfunctional carboxylic acids, alicyclic polyfunctional carboxylic acids and aliphatic polyfunctional carboxylic acids.

2. The fuel system as described in claim 1, wherein the thermoplastic resin constituting the fuel vessel described above comprises at least one selected from the group consisting of polyolefin base resins, ethylene vinyl alcohol copolymer resins and polyethylene terephthalate.

3. The fuel system as described in claim 2, wherein the polyolefin base resins comprise high density polyethylene.

4. The fuel system as described in claim 1, wherein the thermoplastic resin constituting the tube for a fuel described above comprises at least one selected from the group consisting of polyolefin based resins having flexibility, polyamide based resins, polyurethane base resins, polyester base resins and polyacryl base resins.

5. The fuel system as described in claim 1, wherein the thermoplastic resin constituting tube for a fuel described above comprises vinyl based resins.

6. The fuel system as described in claim 1, wherein the alkyleneoxide described above comprises at least one compound selected from an alkyleneoxide having carbon atoms of 2 to 4.

7. The fuel system as described in claim 1, wherein the fuel system comprises a fuel vessel which the coating layer is formed on any surface of the inside of the fuel vessel body at an area rate of 50 to 100%.

8. The fuel system as described in claim 1, wherein the fuel system comprises the fuel vessel equipped with the molded parts for a fuel and the coating layer is formed on any surface of the inside of the molded parts for a fuel.

9. The fuel system as described in claim 1, wherein the fuel system comprises the fuel vessel equipped with the molded parts for a fuel and the coating layer is formed on at least one of connected parts of the fuel vessel and the molded parts for a fuel.

10. The fuel system as described in claim 1, wherein said active hydrogen-containing compound (A) includes at least 3 active hydrogen atoms.

11. The fuel system as described in claim 1, wherein a ratio of isocyanate groups contained in said organic polyisocyanate compound (B) to total number of OH groups and amino groups in said active hydrogen-containing compound (A) falls in a range of 0.8 to 2.0.

12. The fuel system as described in claim 1, wherein said coating layer has a thickness of 1-200 μm.

13. The fuel system as described in claim 1, wherein said skeletal structure represented by Formula (1), contained in the coating layer, accounts for at least 48% by weight thereof.

14. The fuel system as described in claim 1, wherein the fuel system comprises a fuel vessel which the coating layer is formed on any surface of the inside of the fuel vessel body at an area rate of 75 to 100%.

15. The fuel system as described in claim 1, wherein the fuel system comprises a fuel vessel which the coating layer is formed on any surface of the inside of the fuel vessel body at an area rate of 80 to 100%.

16. The fuel system as described in claim 1, wherein the coating layer is formed only on the surfaces of the insides of at least one of the fuel vessel body, the molded part bodies for a fuel and the tube body for a fuel or at least one of connected parts in these bodies.

* * * * *